United States Patent
Kang et al.

(10) Patent No.: US 7,426,007 B2
(45) Date of Patent: Sep. 16, 2008

(54) LIQUID CRYSTAL DISPLAY PANEL HAVING SEAL PATTERN SUPPORT MEMBER

(75) Inventors: Kyung-Kyu Kang, Gyoungsangnam-Do (KR); Myung-Woo Nam, Gyoungsangbok-Do (KR); Bong-Chul Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 8 days.

(21) Appl. No.: 10/823,779

(22) Filed: Apr. 14, 2004

(65) Prior Publication Data

US 2004/0257504 A1    Dec. 23, 2004

(30) Foreign Application Priority Data

Apr. 15, 2003 (KR) ............. 10-2003-0023768

(51) Int. Cl.
G02F 1/1339 (2006.01)
G02F 1/1333 (2006.01)

(52) U.S. Cl. .............. 349/153; 349/190; 349/110; 349/122

(58) Field of Classification Search .......... 349/106, 349/110, 111, 122, 138, 153, 190
See application file for complete search history.

(56) References Cited

U.S. PATENT DOCUMENTS

| | | | | |
|---|---|---|---|---|
| 5,358,810 A | * | 10/1994 | Yoshino | 430/20 |
| 5,432,626 A | * | 7/1995 | Sasuga et al. | 349/58 |
| 5,481,388 A | * | 1/1996 | Aoya | 349/153 |
| 5,739,880 A | * | 4/1998 | Suzuki et al. | 349/110 |
| 5,818,550 A | * | 10/1998 | Kadota et al. | 349/43 |
| 6,392,735 B1 | | 5/2002 | Tani | |
| 6,429,917 B1 | * | 8/2002 | Okamoto et al. | 349/110 |
| 6,466,294 B1 | * | 10/2002 | Yamagishi et al. | 349/155 |
| 6,759,172 B2 | * | 7/2004 | Huh et al. | 430/7 |
| 6,850,308 B2 | * | 2/2005 | Fujioka et al. | 349/153 |
| 2002/0085160 A1 | * | 7/2002 | Ha et al. | 349/153 |

FOREIGN PATENT DOCUMENTS

| | | |
|---|---|---|
| JP | 08-220528 | 8/1996 |
| JP | 08-278507 | 10/1996 |
| JP | 09-211473 | 8/1997 |
| JP | 10-268285 | 10/1998 |
| JP | 10-325951 | 12/1998 |
| JP | 2000-284299 | 10/2000 |

(Continued)

Primary Examiner—Mike Qi
(74) Attorney, Agent, or Firm—McKenna, Long & Aldridge LLP (57) ABSTRACT

In a liquid crystal display panel, in case that a seal pattern is formed on a black matrix and an over-coat layer which are made of an organic material, the over-coat layer is formed to have a thickness of about 1.2 μm to about 5 μm thereby preventing the black matrix from being depressed as the support member added to the seal pattern is pressed by the outer pressure caused in or after attaching the liquid crystal display panel, so that a crack can be prevented from occurring at interfaces between the over-coat layer and the black matrix, and between the black matrix and the substrate, and also, a break of the seal pattern may be prevented.

15 Claims, 7 Drawing Sheets

| | FOREIGN PATENT DOCUMENTS | | | KR | 10-1997-0016673 | 4/1997 |
|---|---|---|---|---|---|---|
| | | | | KR | 1019970016673 A * | 4/1997 |
| JP | 2000-338474 | 12/2000 | | KR | 100142831 B1 | 4/1998 |
| JP | 2002-139725 | 5/2002 | | KR | 10-2002-0017189 A | 3/2002 |
| KR | 01-234826 | 9/1989 | | | | |

* cited by examiner

LIQUID CRYSTAL DISPLAY PANEL HAVING SEAL PATTERN SUPPORT MEMBER

This application claims the benefit of the Korean Application No. P2003-023768 filed on Apr. 15, 2003, which is hereby incorporated by reference for all purposes as if fully set forth herein.

BACKGROUND OF THE INVENTION

1. Field of the Invention

The present invention relates to a liquid crystal display panel, and more particularly, to a liquid crystal display panel capable of preventing air from flowing into an image display part of a liquid crystal display panel where a thin film transistor array substrate and a color filter substrate are attached to each other.

2. Discussion of the Related Art

In general, a liquid crystal display device is a display device where data signals including picture information are individually supplied to liquid crystal cells arranged in a matrix form. The light transmittance of the liquid crystal cells is controlled based on these data signals to display a desired picture.

Thus, the liquid crystal display device includes a liquid crystal display panel where the pixels are arranged in a matrix, and where a driver integrated circuit (IC) drives the pixels.

In the liquid crystal display panel, a thin film transistor array substrate and a color filter substrate face each other, but they are separated from each other by a certain predetermined distance generally referred to as a cell-gap. A liquid crystal layer is formed in this cell gap.

The thin film transistor array substrate and the color filter substrate are attached to each other by a seal pattern formed along the outer edge of an effective image display portion of the LCD panel. When the seal pattern is formed, a spacer is formed on the thin film transistor array substrate or on the color filter substrate, to provide the desired cell-gap therebetween.

On outer surfaces of these substrates, other components such as a polarizing plate, a retardation plate and the like are installed. These other components are selected so as to vary the propagation of light and the refraction ratio in order to construct a liquid crystal display device having a high brightness and contrast characteristics.

On the portion of the liquid crystal display panel where the thin film transistor array substrate and the color filter substrate face each other, a common electrode and a pixel electrode are formed. These electrodes are used to apply an electric field to the liquid crystal layer. That is, a voltage applied to the pixel electrode is controlled by the voltage applied to the common electrode. In doing so the light transmittance of the pixels can be individually controlled. In order to independently control the voltage applied to the pixel electrode of each pixel by unit pixel, a thin film transistor formed at each pixel is used as a switching device.

Liquid crystal display devices are generally classified into two categories: twisted nematic (TN) mode liquid crystal displays and in-plane switching (IPS) mode liquid crystal display panel.

In the TN mode liquid crystal display, a pixel electrode for each individual pixel is formed on a thin film transistor array substrate. In addition, a common electrode is formed on an entire surface of a color filter substrate. Thus, the liquid crystal layer is driven by an electric field between the pixel electrodes formed on the thin film transistor array substrate and the common electrode formed on the color filter substrate.

In the IPS mode liquid crystal display, both a pixel electrode and a common electrode are formed on a thin film transistor array substrate a certain distance apart. The liquid crystal layer is driven by the horizontal electric field between the pixel electrode and the common electrode formed on the thin film transistor array substrate.

Figure 1:
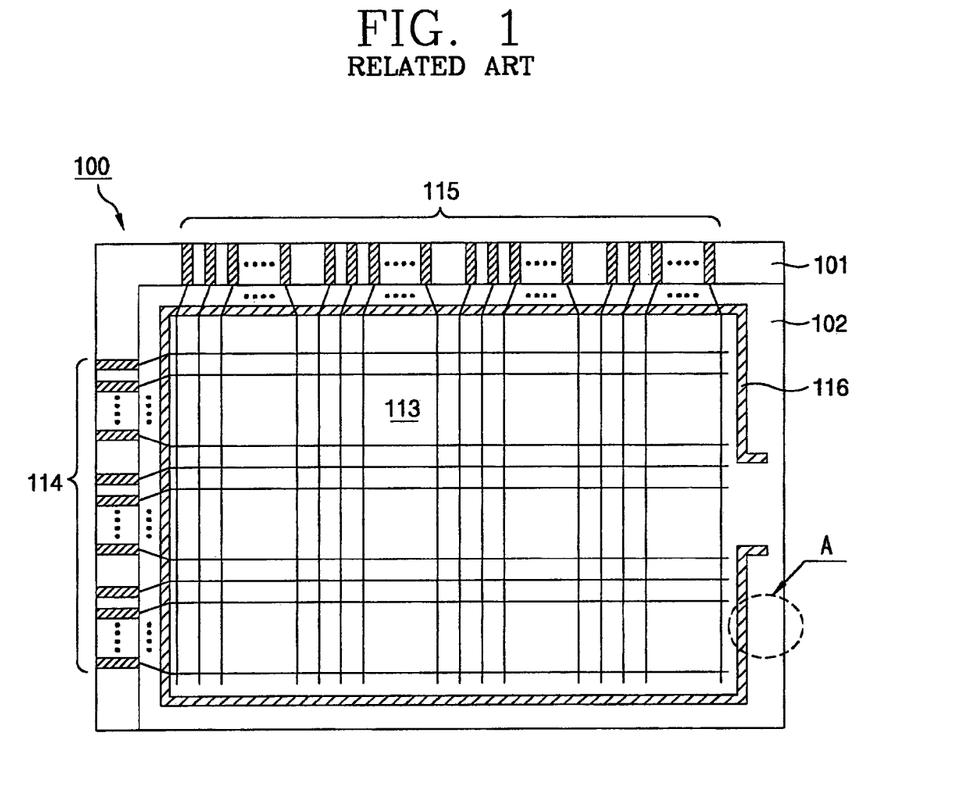
FIG. 1 is an exemplary view illustrating the planar structure of a liquid crystal display panel according to the related art where a thin film transistor array substrate and a color filter substrate face into and are attached to each other.

FIG. 1 is a plane view illustrating the typical structure illustrates a plane structure of a TN mode liquid crystal display panel in which the thin film transistor array substrate and the color filter substrate face each other and are attached to each other by a seal pattern.

In FIG. 1, the thin film transistor array substrate 101 faces and is attached to the color filter substrate, with an edge of one long side thereof and an edge of one short side thereof ate protruded beyond the respective edges of the color filter substrate 102.

In a region where the substrates 101 and 102 face each other, an image display part 113 is provided, where pixels are formed in a matrix. A seal pattern 116 is formed along the outer edge of this image display part 113.

A gate pad part 114 connected to gate lines of the image display part 113 is provided at an edge region of the short side of the thin film transistor array substrate 101 that protrudes beyond the color filter substrate 102.

A data pad part 115 connected to data lines of the image display part 113 is provided at an edge region of the long side of the thin film transistor array substrate 101 that protrudes beyond the color filter substrate 102.

The gate pad part 114 supplies a scan signal from a gate driver integrated circuit to the gate lines of the image display part 113. The data pad part 115 supplies image information from a data driver integrated circuit to the data lines of the image display part 113.

The gate lines to which the scan signal is applied and the data lines to which the image information is applied intersect one another on the thin film transistor array substrate 101 to define a matrix of pixels. A thin film transistor is provided at each intersection for switching the pixel at that intersection.

A red, green or blue color filter corresponding to a pixel is provided on the color filter substrate 102. A black matrix is also provided to prevent the leakage of light generated by a back-light and to prevent the mixing of colors from adjacent unit pixels.

In the TN mode liquid crystal display panel, a pixel electrode is provided at the thin film transistor array substrate 101, and a common electrode is provided at the color filter substrate 102 to drive a liquid crystal layer. In the IPS mode liquid crystal display panel, both pixel electrode and a common electrode are provided at the thin film transistor array substrate 101 to drive a liquid crystal layer.

The thin film transistor array substrate 101 and the color filter substrate 102 a cell-gap separating them. The cell-gap is maintained by a spacer so that the substrates remain separated from each other. The substrates are attached to each other by a seal pattern 116 formed along the outer edge of the image display part 113. A liquid crystal injection hole is provided on one side of the seal pattern 116 for injecting liquid crystal between the thin film transistor array substrate 101 and the color filter substrate 102. The liquid crystal injection hole is sealed after the injection of the liquid crystal is complete.

The cell-gap between the thin film transistor array substrate 101 and the color filter substrate 102 is constant at the image display part 113, but it varies in the region where the seal pattern 116 is formed because the sealant is pressed and spread by the pressure applied during assembly to attach the thin film transistor array substrate 101 to the color filter substrate 102.

In order to prevent the size of the cell-gap from varying, a glass fiber or a glass ball is added to the seal pattern 116 as a support member for maintaining the cell-gap.

Figure 2:
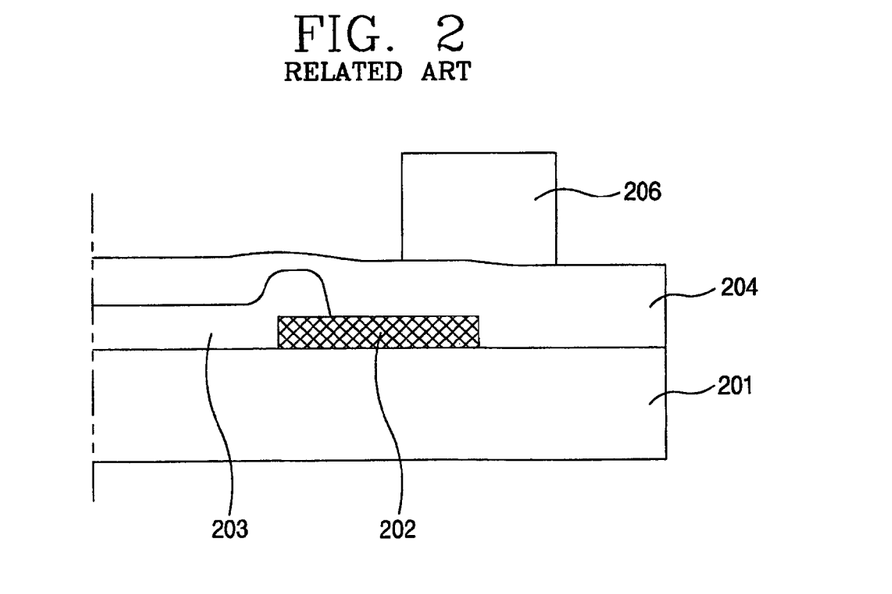
FIG. 2 is an exemplary view illustrating a sectional structure of a color filter substrate for a region 'A' of FIG. 1 in case of an IPS mode liquid crystal display panel.

FIG. 2 is a sectional view illustrating a color filter substrate for a region 'A' of FIG. 1 in an IPS mode liquid crystal display panel.

With reference to FIG. 2, a color filter substrate of an IPS mode liquid crystal display panel includes a black matrix 202 made of a resin material patterned at a region separated by a fixed distance from one end portion of a transparent substrate 201 and a boundary region of pixels. The black matrix prevents leakage of light generated from a back-light and prevents a mixture of colors from adjacent pixels. A red, green, or blue color 203 partially overlaps the black matrix corresponding to a unit pixel. An over-coat layer 204 is formed on an entire surface of an upper portion of the transparent substrate 201, including the black matrix 202 and the color filter 203. A seal pattern 206 is formed on an upper surface of the over-coat layer 204 formed on the edge of the transparent substrate 201 so as to partially overlap the black matrix 202.

The black matrix 202 formed at the color filter substrate of the IPS mode liquid crystal display panel is made of a resin material.

The over-coat layer 204 is formed on an entire surface of the upper portions of the black matrix 202 and the color filter 203 to planarize a surface. That is, because a black matrix 202 formed of an organic film such as a resin material is applied as a thick film, the over-coat layer 204 is also formed of an organic material in order to prevent a deficiency in driving a liquid crystal layer which is caused by a step occurring at the region where the black matrix 202 and the color filter 203 overlap with each other.

As stated above, a glass fiber or a glass ball is added to the seal pattern 206 as a support member for maintaining a cell-gap.

Figure 3:
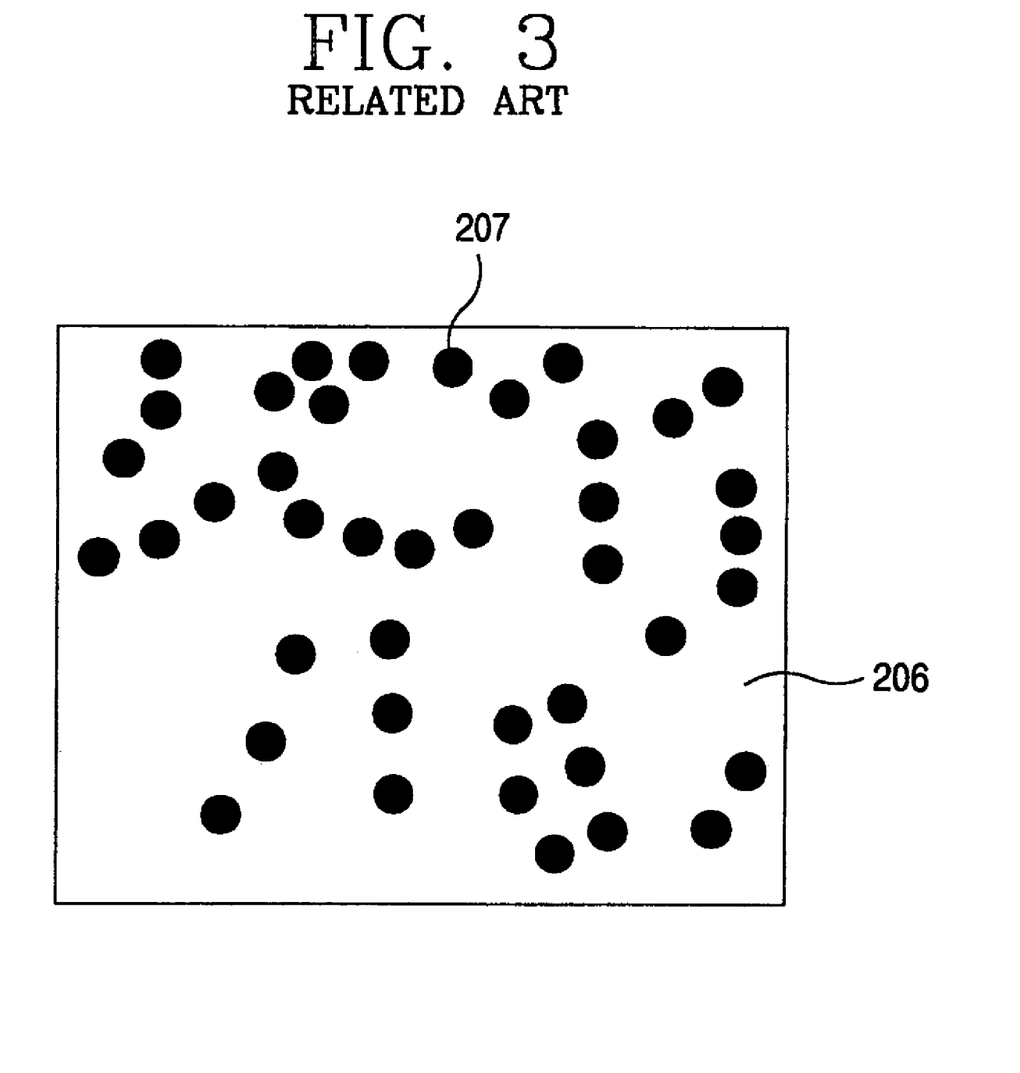
FIG. 3 is an exemplary view illustrating a distribution state of a glass fiber added in a seal pattern at a weight ratio of about 1%, in FIG. 2.

FIG. 3 illustrates a magnified view of the distribution of glass fibers added to the inside of the seal pattern 206.

A seal pattern 206 is formed at an upper surface of a black matrix 202 or at an over-coat layer 204 formed of an organic film material. As the glass fiber 207 added to the seal pattern 206 it depresses the black matrix 202 and the over-coat layer 204 from external pressure caused during or after attaching the thin film transistor array substrate to the color filter substrate cracks form at the interfaces between the over-coat layer 204 and the black matrix 202, and between the black matrix 202 and the transparent substrate 201. Outside air flows into the image display part through the cracks, thereby degrading the quality of the liquid crystal display panel. This will be described in detail with reference to FIGS. 4a and 4b.

Figure 4A:
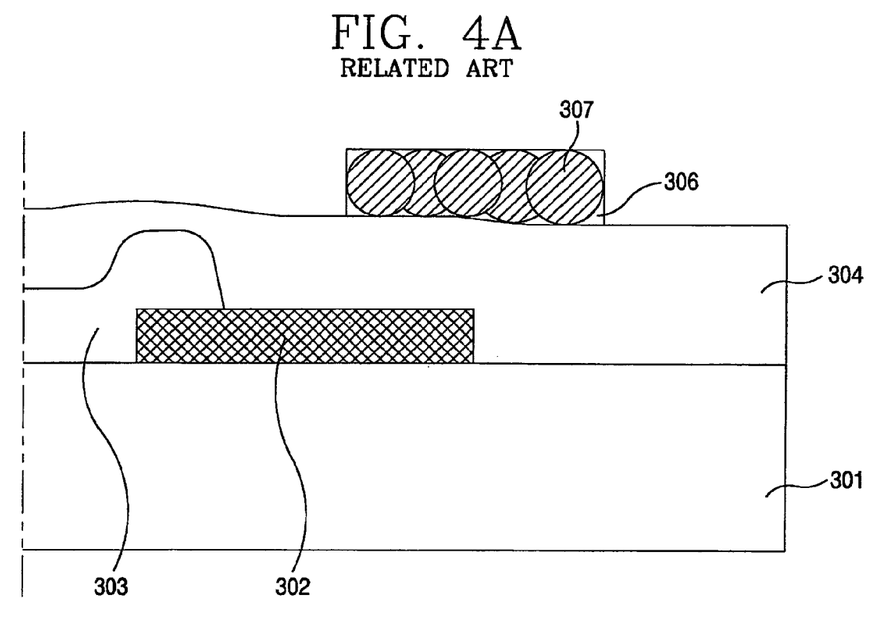
FIGS. 4a and 4b are exemplary views illustrating the defect that occurs when a glass fiber is added to a seal pattern in FIG. 3.
Figure 4B:
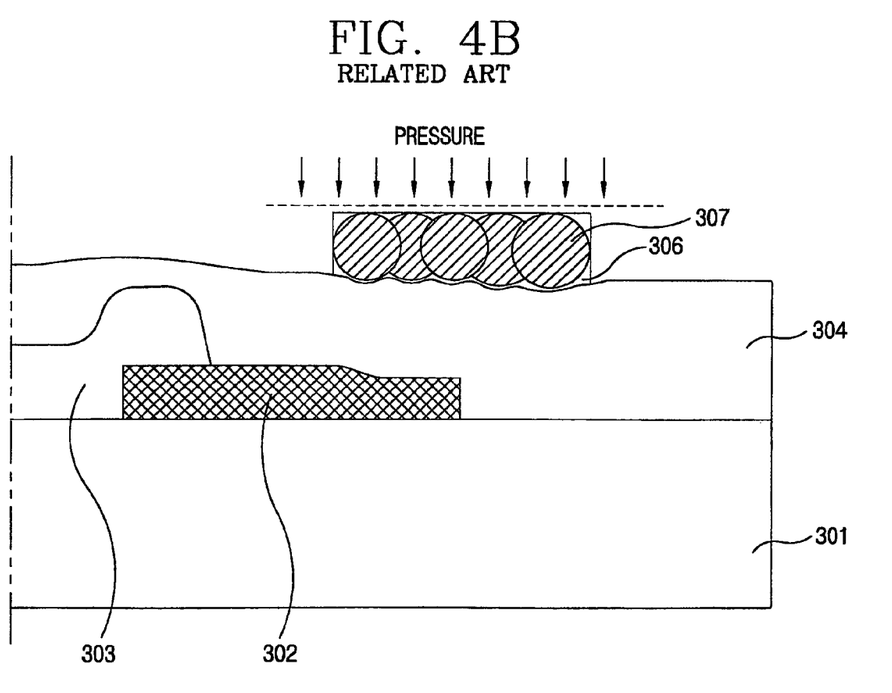

FIGS. 4a and 4b illustrate an organic film black matrix 302 formed of a resin material patterned at a region separated by a fixed distance from one end portion of a first transparent substrate 301 and at a boundary region of pixels so as to prevent leakage of light generated from a back-light and so as to prevent a mixture of colors from adjacent pixels. A red, green or blue color filter 303 is formed so as to partially overlap with the black matrix 302 such that it corresponds to a pixel. An over-coat layer 304 formed of an organic film, and is formed at an entire surface of an upper portion of the first transparent substrate 301 including the black matrix 302 and the color filter 303. A seal pattern 306 is formed on an upper surface of the over-coat layer 304 that is formed along an edge portion of the first transparent substrate 301 so as to partially overlap with the black matrix 302. A glass ball or glass fiber 307 is added to the seal pattern 306, thereby maintaining a cell-gap distance in the region where the seal pattern 306 is formed. The glass ball or glass fiber 307 has a diameter which is the same as or greater than the cell-gap.

First, as shown in FIG. 4a, in a normal state the glass ball or the glass fiber 307 added to the seal pattern 306 can maintain a cell-gap distance by coming in contact with a thin film transistor array substrate (not shown) and the over-coat layer 304 therebetween.

However, as shown in FIG. 4b, as the glass ball or the glass fiber 307 is pressed by external pressure during or after assembly of the liquid crystal display panel, the black matrix 302 and the over-coat layer 304 are compressed. As the black matrix 302 and the over-coat layer 304 formed of an organic material are compressed, cracks form at interfaces between the over-coat layer 304 and the black matrix 302, and between the black matrix 302 and a first transparent substrate 301. Outside air flows into the image display part through the cracks, thereby degrading and contaminating the liquid crystal display panel, and the seal pattern 306.

As described above, in the related art IPS mode liquid crystal display panels, a glass fibers or a glass balls maintaining a cell-gap distance between the thin film transistor array substrate and the color filter substrate are added to the seal pattern that attaches the thin film transistor array substrate to the color filter substrate. But, when external pressure is used during or after attaching the thin film transistor array substrate to the color filter substrate, outside air flows into the image display part, degrading the quality and performance of the liquid crystal display panel and breaking the seal pattern.

SUMMARY OF THE INVENTION

Accordingly, the present invention is directed to a liquid crystal display device that substantially obviates one or more of the problems due to limitations and disadvantages of the related art.

Therefore, an advantage of the present invention is to provide a liquid crystal display panel capable of preventing air from flowing into an image display part of a liquid crystal display panel by outer pressure caused in or after attaching the liquid crystal display panel.

To achieve these and other advantages and in accordance with the purpose of the present invention, as embodied and broadly described herein, there is provided a liquid crystal display panel according to a first embodiment including a black matrix formed of a resin material, and formed at a predetermined region of a first substrate and at a boundary region of pixels; a color filter on the black matrix so as to correspond to the pixels; an over-coat layer on the first substrate having the black matrix and the color filter; a seal pattern on the over-coat layer; and a second substrate attached to the first substrate by the seal pattern, wherein a thickness of the over-coat layer is between about 1.2 μm and 5 μm.

To achieve these and other advantages and in accordance with the purpose of the present invention, as embodied and broadly described herein, there is provided a liquid crystal display panel according to a second embodiment including a black matrix formed of a resin material, and formed at a predetermined region of a first substrate; a color filter on the black matrix so as to correspond to the pixels; an over-coat layer on the first substrate having the black matrix and the color filter; a common electrode on the over-coat layer; a seal pattern on the common electrode; and a second substrate attached to the first substrate by the seal pattern, wherein the thickness of the over-coat layer is about 1.2 μm to about 5 μm.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings.

Figure 5:
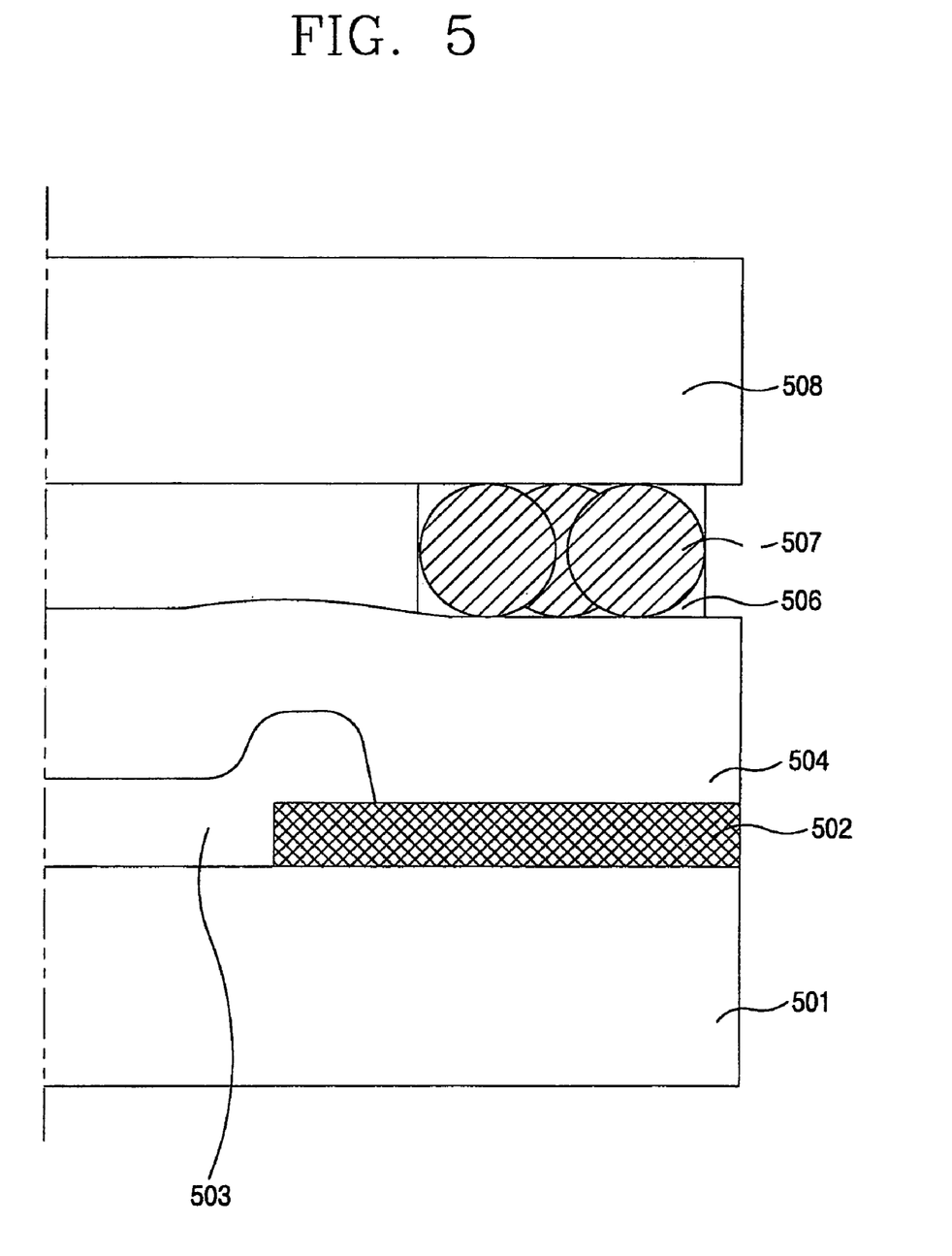
FIG. 5 is an exemplary view illustrating a sectional structure of an IPS mode liquid crystal display panel according to a first embodiment of the present invention.

FIG. 5 is an exemplary view illustrating a sectional structure of a liquid crystal display panel according to a first embodiment of the present invention.

With reference to FIG. 5, a liquid crystal display panel includes a black matrix 502 formed of an organic film such as a resin material, patterned at a region constantly separated from one end portion of a first transparent substrate 501 and at a boundary region of pixels to prevent a leakage of light generated from a back-light, and to prevent a mixture of colors from adjacent pixels; a red, green or blue color filter 503 partially overlapping with the black matrix 502 and formed to correspond to a unit pixel; an over-coat layer 504 formed at an entire surface of an upper portion of the first transparent substrate 501 including the black matrix 502 and the color filter 503; a seal pattern 506 formed on a structure that the black matrix 502 and the over-coat layer 504 are laminated; a support member 507 added to the seal pattern 506; and a second transparent substrate 508 attached to the first transparent substrate 501 by the seal pattern, wherein the thickness of the over-coat layer 504 is about 1.2 µm to about 5 µm.

As described above, on the first transparent substrate 501, the black matrix 502, the color filter 503 and the over-coat layer 504 are formed, and the first transparent substrate is applied as a color filter substrate of an IPS mode liquid crystal display panel.

On the second transparent substrate 508, gate lines to which the scan signal is applied, and data lines to which the image information is applied, intersect one another, so that the unit pixels are defined in a matrix form. At the intersection, a thin film transistor for switching a unit pixel is provided, and at the unit pixel, a common electrode and a pixel electrode for driving a liquid crystal layer are provided. Thus, the second transparent substrate is applied as a thin film transistor array substrate of the IPS mode liquid crystal display panel.

For the black matrix 502, an organic film formed of a resin material is used. For example, a colored organic series material such as acryl, epoxy or polyimide resin or the like including one of a carbon black material or a black pigment may be applied as the black matrix 502.

The over-coat layer 504 is formed at an entire surface of an upper portion of the black matrix 502 and the color filter 503 to planarize the surface. That is, as a black matrix 502 formed of an organic film such as a resin material is applied as a thick film, the over-coat layer 504 is formed of an organic material in order to prevent deficiency in driving a liquid crystal layer, which is caused by a step deficiency occurring at a region where the black matrix 502 and the color filter 503 overlap with each other. For example, as the over-coat layer, a resin such as epoxy, acryl, polyimide or the like may be formed at a thickness of about 1.2 µm to about 5 µm.

As stated above, the second transparent substrate 508 applied as the thin film transistor array substrate faces and is attached to the first transparent substrate 501 applied as the color filter substrate, so that an edge of one long side thereof and an edge of one short side thereof are protruded compared to the first transparent substrate 501. A gate pad part connected to the gate lines is provided at the edge portion of one short side of the second transparent substrate 508, which is protruded compared to the first transparent substrate 501. A data pad part connected to the data lines is provided at the edge portion of one long side of the second transparent substrate 508, which is protruded compared to the first transparent substrate 501.

The gate pad part supplies a scan signal supplied from a gate driver integrated circuit to the gate lines formed on the thin film transistor array substrate, and the data pad part supplies image information supplied from a data driver integrated circuit to the data lines formed on the thin film transistor array substrate.

The first transparent substrate 501 and the second transparent substrate 508 constructed as above are provided with a cell-gap therebetween. The cell-gap is maintained by a spacer which is attached to each of the transparent substrates by the seal pattern, thus forming an IPS mode liquid crystal display panel. Furthermore, a liquid crystal layer is formed at a region where the first transparent substrate 501 and the second transparent substrate 508 are separated from each other. The seal pattern 506 may be formed either on the first transparent substrate 501 or the second transparent substrate 508.

The seal pattern 506 may be formed of various planar shapes depending on a method used to form the liquid crystal layer. The method of forming the liquid crystal layer may be classified as a vacuum injection method or a dropping method.

The vacuum injection method forms an LCD panel by dipping a liquid crystal injection hole of a liquid crystal display panel into a container in a vacuum chamber filled with liquid crystal. Liquid crystal is then forced into the liquid crystal display panel by the pressure difference between the inner side and the outer side of the liquid crystal display panel, and can be controlled by varying the degree of vacuum. After the liquid crystal fills in the liquid crystal display panel, the liquid crystal injection hole is sealed to form a liquid crystal layer of the liquid crystal display panel.

The liquid crystal injection hole in the vacuum injection method is defined as an open region of one side of the seal pattern 506. Accordingly, in the case of forming a liquid crystal layer on the liquid crystal display panel through the vacuum injection method, a portion of the seal pattern 506 is formed open so that it functions as a liquid crystal injection hole.

However, the vacuum injection method as described above has a number of problems.

In the vacuum injection method, it takes a long time to fill the liquid crystal in the liquid crystal display panel. In general, a liquid crystal display panel with an area of several hundred square-centimeters ($cm^2$) has a cell gap of a few micrometers ($\mu m$). Thus, even with the pressure difference of vacuum injection method, the amount of liquid crystal injected into the panel unit time is quite small. In addition, as the size of the liquid crystal display panel increases, the time required to fill the liquid crystal is lengthens accordingly making the possibility that deficiencies in filling the liquid crystal may arise. Therefore, the vacuum injection method cannot be used for a large-scale maintaining of liquid crystal display panels.

In addition, a large quantity of liquid crystal is consumed in the vacuum injection method. In general, the actual amount of liquid crystal that enters the panel is very small compared to the amount of the liquid crystal filling in the container. But when the liquid crystal on the container is exposed to air or a specific gas, it reacts with the gas and becomes degraded. Thus, even if the liquid crystal in the container is used to fill a plurality of liquid crystal display panels, a large amount of the liquid crystal will still be remaining after the filling process and must be discarded. As a result, the unit price of the liquid crystal display is increased.

In order to overcome these problems of the vacuum injection method, a dropping method has recently been adopted.

The dropping method forms an LCD panel by dropping and dispensing liquid crystal on an image display part of the first transparent substrate 501 or the second transparent substrate 508, of the LCD panel so that the liquid crystal is uniformly distributed on the entire image display part by the pressure generated when the first transparent substrate 501 and the second transparent substrate 508 are attached to each other, thereby forming a liquid crystal layer.

In the case of forming a liquid crystal layer through the dropping method, the liquid crystal is not filled from the outside but is directly dropped on the substrate. Thus, the seal pattern 506 is formed to have a closed shape that encompasses the outer edge of the image display part in order to prevent the external leakage of the liquid crystal from the image display part.

In the dropping method, the liquid crystal may be dropped within a short time compared to the vacuum injection method. Thus, for a large-sized liquid crystal display panel, a liquid crystal layer can be quickly formed between the substrates.

In addition, since only a required amount of the liquid crystal is dropped on the substrate, the unit price of the liquid crystal display panel as in the vacuum injection method can be kept low.

Unlike the vacuum injection method, the first transparent substrate 501 and the second transparent substrate 508 are attached to each other after the liquid crystal layer is formed by the dropping method.

In the dropping method, if the seal pattern 506 is formed of a thermo-hardening sealant, the seal may flowed out in the later process of attaching the first transparent substrate to the second transparent substrate, whereby the dropped liquid crystal may be contaminated. Accordingly, in the dropping method, a ultraviolet (UV)-hardening sealant may be used for a seal pattern 506, or a mixture of the ultraviolet-hardening sealant and the thermo-hardening sealant may be used.

Between the first transparent substrate 501 and the second transparent substrate 508 as described above, a constant cell-gap is maintained at a region where a spacer is formed. But at a region where the seal pattern 506 is formed, the sealant is pressed and widely spread by pressure caused when the first transparent substrate 501 and the second transparent substrate 508 are attached to each other. This cause the cell-gap to vary. For a spacer, a ball spacer or a column spacer may be used, and a column spacer may be formed by applying an organic film such as acryl, BCB (BenzoCycloButene) or the like, and patterning the organic film through a photolithography process.

Accordingly, in order to prevent the cell-gap from varying a support member 507 for maintaining the cell-gap is added to the seal pattern 506. A spherical or cylindrical glass ball or glass fiber having a diameter of about ±1 mm compared to the cell-gap is used as a support member 507, between the first transparent substrate 501 and the second transparent substrate 508. The cylindrical glass fiber may prevent aggregation compared to the spherical glass ball.

The support member 507 may be added to the seal pattern at a weight ratio of about 1% or less to a sealant of the seal pattern 506, or the support member 507 may be added to the seal pattern so that about 550 or fewer support members are distributed in at least one of unit areas of about 1 mm×1 mm of the seal pattern 506. The number of support members may be varied according to a specific gravity or a weight ratio thereof.

A diameter of the spherical glass ball may be varied according to that of the spacer. For example, if the diameter of the spacer is about 4.8 $\mu m$, a spherical glass ball having a diameter of about 3.8 to about 7.5 $\mu m$ is generally used. A diameter of such a spherical glass ball is the same as or greater than the cell-gap. In addition, when the spherical glass ball, (the support member 507) is added to the seal pattern 506, about 150 to about 550 glass balls may be distributed in at least one of unit area of 1 mm×1 mm of the seal pattern 506.

A diameter of the cylindrical glass fiber may be varied according to that of the spacer as well. For example, if the diameter of the spacer is about 4.8 $\mu m$, a cylindrical glass fiber having a diameter of about 3.8 $\mu m$ to about 7.5 $\mu m$ and a length of about 20 $\mu m$ is generally used. A diameter of such a cylindrical glass fiber is the same as or greater than the cell-gap. In addition, when the cylindrical glass fiber (the support member 507) is added to the seal pattern 506, about 30 to about 200 glass fibers may be distributed in at least one 1 mm×1 mm unit area of the seal pattern 506.

The number of cylindrical glass fibers can be varied according the diameter of the length thereof. For example, on the assumption that about 100 glass fibers are distributed in at least one 1 mm×1 mm unit area of the seal pattern when the length thereof is about 20 $\mu m$, about 200 glass fibers may be distributed-when its length is about 10 $\mu m$, and about 450 glass fibers may be distributed when its length is about 5 $\mu m$.

As described in detail with reference to the exemplary view of the related art of FIG. 4b, as a glass ball or a glass fiber 307 added to a seal pattern 306 is pressed by the outer pressure, a black matrix 302 and an over-coat layer 304 made of an organic material are likewise depressed. So, a crack may be generated at interfaces between the over-coat layer 304 and the black matrix 302, and between the black matrix 302 and the first transparent substrate 301. Through the crack, outside air can flow into an image display part thereby causing deficiency in the liquid crystal display panel, and generating a break of the seal pattern 306.

But, in the IPS mode liquid crystal display panel according to one embodiment of the present invention, in order to prevent deficiency in driving a liquid crystal layer, which is caused by step deficiency occurring at a region where the black matrix 502 and the color filter 503 overlap with each other, the over-coat layer 504 formed of an organic material is formed to have a thickness of about 1.2 µm to about 5 µm, thereby preventing depression of the black matrix 502.

That is, when the support member 507 added to the seal pattern 506 is pressed by the outer pressure caused in or after attaching the liquid crystal display panel, the over-coat layer 504 with a thickness of about 1.2 µm to about 5 µm functions as a buffer layer absorbing the external pressure and thereby preventing depression of the black matrix 502. Therefore, cracks can be prevented from occurring at interfaces between the over-coat layer 504 and the black matrix 502, and between the black matrix 502 and the first transparent substrate 501.

Furthermore, outer air is prevented from flowing into the image display part thereby minimizing deficiency in the liquid crystal display panel, and preventing a break of the seal pattern 506.

In FIG. 5, the seal pattern 506 is formed on a structure that the black matrix 502 and the over-coat layer 504 are laminated. But, the IPS mode liquid crystal display panel according to one embodiment of the present invention can be also applied when the seal pattern 506 is formed so as to partially overlap with the black matrix 502.

Figure 6:
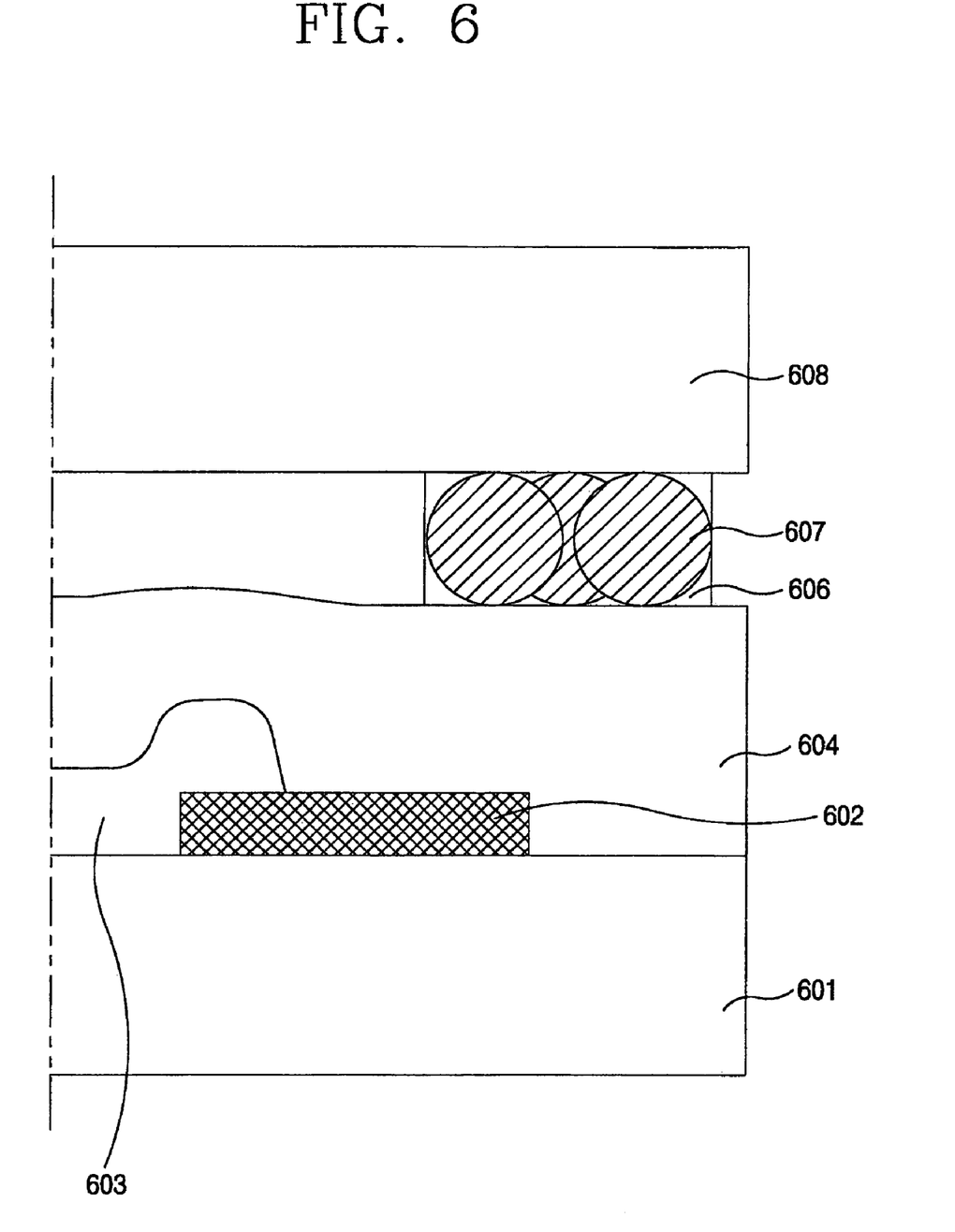
FIG. 6 is an exemplary view illustrating a sectional structure of an IPS mode liquid crystal display panel in which a seal pattern is formed so as to partially overlap with a black matrix, in FIG. 5.

FIG. 6 is an exemplary view illustrating a sectional structure of the IPS mode liquid crystal display panel in which the seal pattern is formed so as to partially overlap with the black matrix.

With reference to FIG. 6, the IPS mode liquid crystal display panel includes a black matrix 602 formed of an organic film such as a resin material, patterned at a region constantly separated from one end portion of a first transparent substrate 601 and at a boundary region of pixels to prevent a leakage of light generated from a back-light, and preventing the mixture of colors from adjacent pixels; a red, green or blue color filter 603 partially overlapping with the black matrix 602, and formed to correspond to a unit pixel; an over-coat layer 604 formed at an entire surface of an upper portion of the first transparent substrate 601 including the black matrix 602 and the color filter 603; a seal pattern 606 formed at an upper portion of the over-coat layer 604 formed on the edge portion of the first transparent substrate 601 so as to partially overlap with the black matrix 602; a support member 607 added to the seal pattern 606; and a second transparent substrate 608 attached to the first transparent substrate by the seal pattern 606, wherein the thickness of the over-coat layer 604 is about 1.2 µm to about 5 µm.

The over-coat layer 604 is formed to have a thickness of about 1.2 µm to about 5 µm in the same manner as the over-coat layer 504 of FIG. 5, thereby preventing depression of the black matrix 602 that partially overlaps the seal pattern 606.

That is, when the support member 607 added to the seal pattern 606 is pressed by the outer pressure caused in or after attaching the liquid crystal display panel, the over-coat layer 604 with a thickness of about 1.2 µm to about 5 µm functions as a buffer absorbing the pressure, thereby preventing depression of the black matrix 602 which partially overlaps the seal pattern 606. As the depression of the black matrix 602 is prevented, a crack can be prevented from occurring at interfaces between the over-coat layer 504 and the black matrix 502, and between the black matrix 502 and the first transparent substrate 501.

Accordingly, the outer air is prevented from flowing into the image display part thereby minimizing deficiency in the liquid crystal display panel, and preventing a break of the seal pattern 606.

Figure 7:
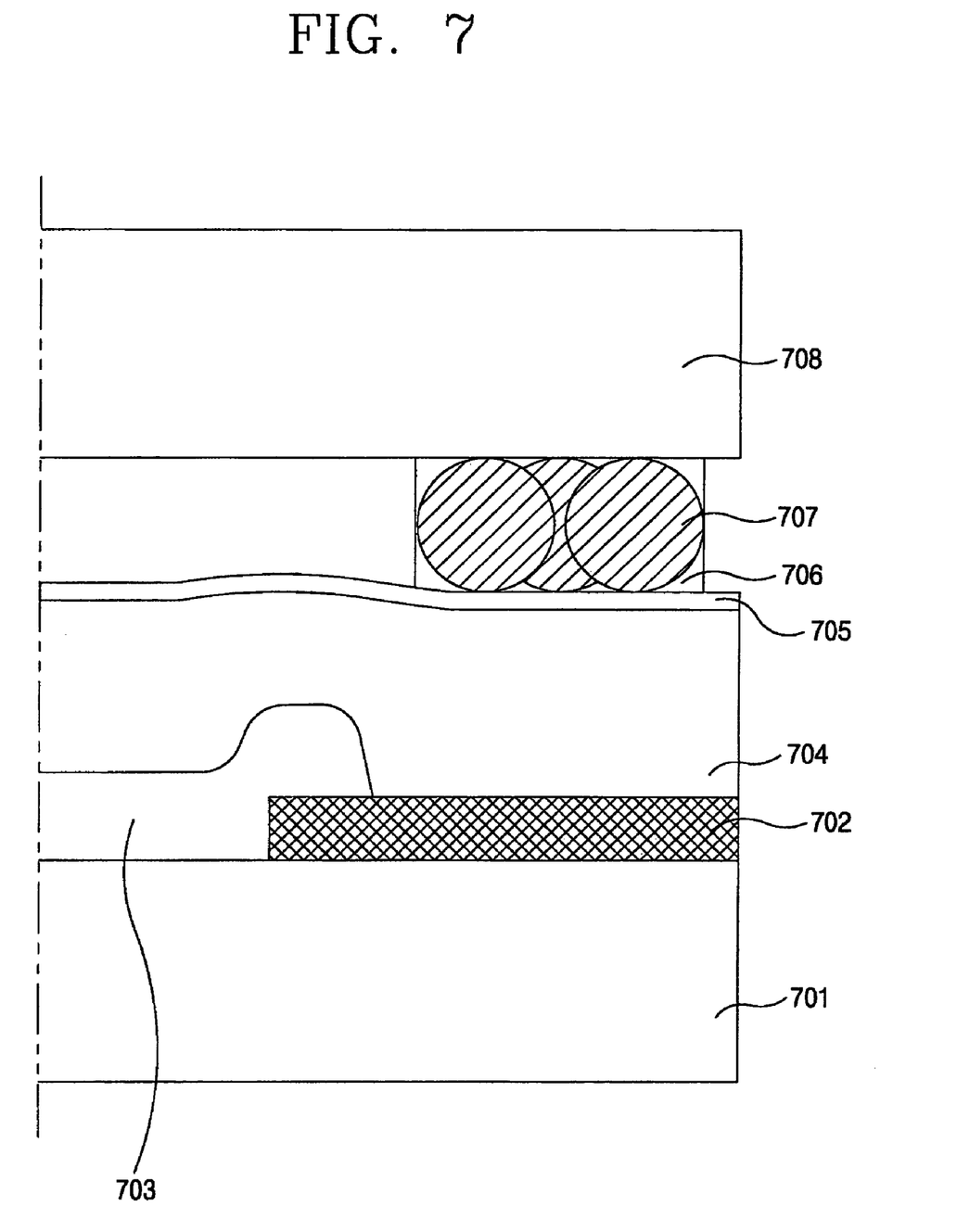
FIG. 7 is an exemplary view illustrating a TN mode liquid crystal display panel according to a second embodiment of the present invention.

FIG. 7 is an exemplary view illustrating a sectional structure of a TN mode liquid display panel according to a second embodiment of the present invention.

With reference to FIG. 7, the TN mode liquid crystal display panel includes a black matrix 702 formed of an organic film such as a resin material, patterned at a region constantly separated from one end portion of a first transparent substrate 701 and at a border region of pixels to prevent a leakage of light generated from a back-light, and preventing a color mixture of the adjacent pixels; a red, green or blue color filter 703 partially overlapping with the black matrix 702 and formed to correspond to a unit pixel; an over-coat layer 704 formed at an entire surface of an upper portion of the first transparent substrate 701 including the black matrix 702 and the color filter 703; a common electrode 705 formed at an upper portion of the over-coat layer 704; a seal pattern 706 formed on a structure that the black matrix 702, the over-coat layer 704 and the common electrode 705 are laminated; a support member 707 added to the seal pattern 706; and a second transparent substrate 708 attached to the first transparent substrate 701 by the seal pattern 706, wherein a thickness of the over-coat layer 704 is about 1.2 µm to about 5 µm.

On the first transparent substrate 701, the black matrix 702, the color filter 703, the over-coat layer 704 and the common electrode 705 are formed. The first transparent substrate is applied as a color filter substrate of the TN mode liquid crystal display panel. The common electrode 705 can be formed of ITO (indium tin oxide) or IZO (indium zinc oxide), a transparent conductive material.

On the second transparent substrate 708, gate lines to which the scan signal is applied and data lines to which the image information is applied intersect one another, so that the unit pixels are defined in a matrix form. A thin film transistor for switching a unit pixel is provided. At the intersection a pixel electrode for driving a liquid crystal layer with the common electrode 705 formed at the first substrate 701 is provided at the unit pixel. Thus, the second transparent substrate is applied as a thin film transistor array substrate of the TN mode liquid crystal display panel.

For the black matrix 702, an organic film formed of a resin material is used. For example, a colored organic series material such as acryl, epoxy or polyimide resin or the like including one of a carbon black material or a black pigment may be used.

The over-coat layer 704 is formed at an entire surface of an upper portion of the black matrix 702 and the color filter 703 to planarize the surface. That is, as a black matrix 702 formed of an organic film such as a resin material is applied as a thick film, the over-coat layer 704 is formed of an organic material in order to prevent problems driving a liquid crystal layer caused by a step deficiency occurring at a region where the black matrix 702 and the color filter 703 overlap with each other. For example, as the over-coat layer, a resin such as epoxy, acryl, polyimide or the like can be formed at a thickness of about 1.2 µm to about 5 µm.

The first transparent substrate 701 and the second transparent substrate 708 constructed as above are provided with a cell-gap therebetween so as to be constantly separated from each other by a spacer. The substrates are attached to each other by the seal pattern, thus forming a TN mode liquid crystal display panel. A liquid crystal layer is formed at a region where the first transparent substrate 701 and the second transparent substrate 708 are separated from each other. And the seal pattern 706 may be formed at the first transparent substrate 701 or the second transparent substrate 708.

In the case of forming a liquid crystal layer through a vacuum injection method, one portion of the seal pattern 706 is formed open so that it functions as a liquid crystal injection hole. In the case of forming a liquid crystal layer through a dropping method, the seal pattern 706 is formed to have a closed pattern shape to encompass the outer edge of the image display part.

In the first transparent substrate 701 and the second transparent substrate 708 as described above, a constant cell-gap is maintained therebetween at a region where a spacer is formed. But, as is the case a region where the seal pattern 706 is formed, the sealant is pressed and spreads widely by pressure caused during or after attaching the first transparent substrate 701 and the second transparent substrate 708 to each other. Thus the cell-gap varies. A ball spacer or a column spacer may be used as the spacer. The column spacer is formed by forming an organic film such as acryl, BCB (BenzoCycloButene) or the like, and patterning the organic film through a photolithography process.

Accordingly, in order to prevent the cell-gap from varying, a support member 77 is added to the seal pattern 76 for maintaining the cell-gap. At this time, a spherical or cylindrical glass ball or glass fiber having a diameter of about ±1 µm compared to the cell-gap between the first transparent substrate 701 and the second transparent substrate 708 may be applied as a support member 707. The cylindrical glass fiber may prevent aggregation compared to the spherical glass ball.

The support member 707 may be added to the seal pattern at a weight ratio of about 1% or less to sealant of the seal pattern 706, or the support member 707 may be added to the seal pattern so that 550 or fewer support members are distributed in at least one 1 mm×1 mm unit areas of the seal pattern 706. The number of support members 707 may be varied according to specific gravity or weight ratio thereof.

A diameter of the spherical glass ball may be varied according to that of the spacer. For example, if the diameter of the spacer is about 4.8 µm, a spherical glass ball having a diameter of about 3.8 µm to about 7.5 µm is generally used. A diameter of such a spherical glass ball is the same as or greater than the cell-gap. In addition, when the spherical glass balls, the support member 707 are added to the seal pattern 706, approximately about 150 to 550 glass balls may be distributed in at least one 1 mm×1 mm unit area of the seal pattern 706.

A diameter of the cylindrical glass fiber may be varied according to that of the spacer as well. For example, if the diameter of the spacer is about 4.8 µm, a cylindrical glass fiber having a diameter of about 3.8 µm to about 7.5 µm and a length of about 20 µm is generally used. A diameter of such a cylindrical glass fiber is the same as or greater than the cell-gap. In addition, when the cylindrical glass fiber, the support member 707 is added to the seal pattern 706, approximately about 30 to 200 glass fibers may be distributed in at least one 1 mm×1 mm unit area of the seal pattern.

In addition, the number of cylindrical glass fibers can be varied according the diameter of the length thereof. For example, if about 100 glass fibers to be distributed in at least one 1 nm×1 mm unit area of the seal pattern require a length thereof of about 20 µm, then about 200 glass fibers may be distributed when their length is about 10 µm, and about 450 glass fibers may be distributed when their length is about 5 µm.

As described in detail with reference to the related art of FIG. 4b, as a glass ball or a glass fiber 307 added to a seal pattern 306 is pressed by external pressure, a black matrix 302 and an over-coat layer 304 made of an organic material are compressed. So, cracks may be generated at interfaces between the over-coat layer 304 and the black matrix 302, and between the black matrix 302 and the first transparent substrate 301. Thus, through the cracks, outside air may flow into an image display part causing quality defects in the liquid crystal display panel and generating a break in the seal pattern 306.

But, in the TN mode liquid crystal display panel according to the second embodiment of the present invention the over-coat layer 704 is formed of an organic material having a thickness of about 1.2 µm to about 5 µm, thereby preventing compression of the black matrix 702. In order to prevent deficiencies in driving a liquid crystal layer, which are caused by step deficiencies occurring at a region where the black matrix 702 and the color filter 703 overlap with each other.

That is, when the support member 707 added to the seal pattern 706 is pressed by external pressure caused during or after assembly the liquid crystal display panel, the over-coat layer 704, having a thickness of about 1.2 µm to about 5 µm, functions as a buffer layer absorbing the pressure, thereby preventing compression or depression of the black matrix 702. Therefore, a crack may be prevented from occurring at interfaces between the over-coat layer 704 and the black matrix 702, and between the black matrix 702 and the first transparent substrate 701.

Accordingly, outside air is prevented from flowing into the image display part thereby minimizing quality deficiencies in the liquid crystal display panel, and preventing a break of the seal pattern 706.

In the FIG. 7, the seal pattern 706 is formed on a structure so that the black matrix 702 and the over-coat layer 704 are laminated. But, the TN mode liquid crystal display panel according to the second embodiment of the present invention may be also applied when the seal pattern 706 is formed so as to partially overlap with the black matrix 702.

Figure 8:
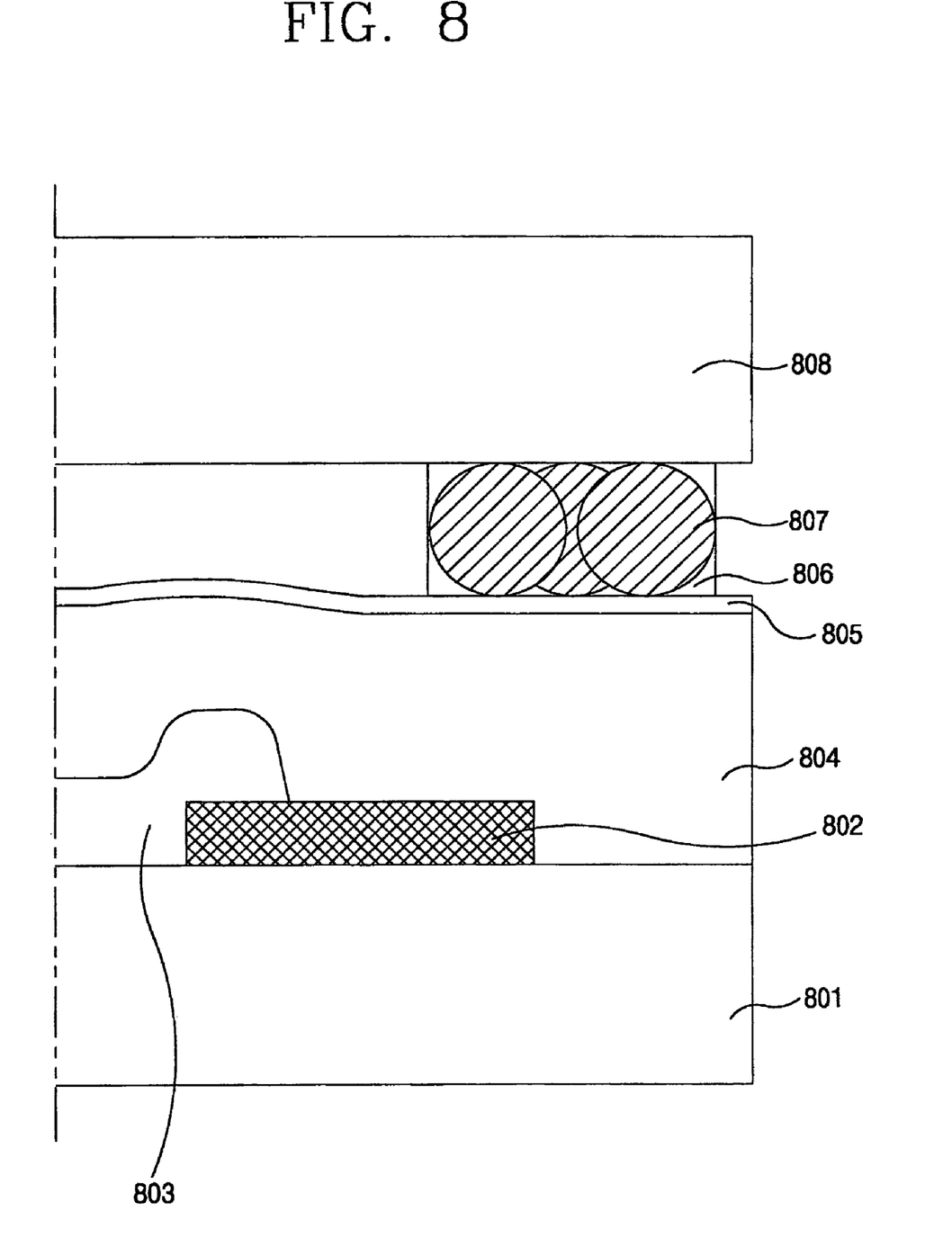
FIG. 8 is an exemplary view illustrating a sectional structure in which a seal pattern is formed so as to partially overlap with a black matrix, in FIG. 7.

FIG. 8 is an exemplary view illustrating a sectional structure of the TN mode liquid crystal display panels according to the present invention in which the seal pattern is formed so as to partially overlap with the black matrix.

With reference to FIG. 8, the TN mode liquid crystal display panel includes a black matrix 802 formed of an organic film such as a resin material, patterned at a region constantly separated from one end portion of a first transparent substrate 801 and at a boundary region of pixels to prevent a leakage of light generated from a back-light, and preventing mixture of colors from adjacent pixels; a red, green or blue color filter 803 partially overlapping with the black matrix 802, and formed to correspond to a unit pixel; an over-coat layer 804 formed at an entire surface of an upper portion of the first transparent substrate 801 including the black matrix 802 and the color filter 803; a common electrode 805 formed at an upper portion of the over-coat layer 804; a seal pattern 806 formed at an upper portion of the over-coat layer 804 formed on the edge portion of the first transparent substrate 801 so as to partially overlap with the black matrix 802; a support member 807 added to the seal pattern 806; and a second transparent substrate 808 attached to the first transparent substrate 801 by the seal pattern 806, wherein the thickness of the over-coat layer 804 is about 1.2 μm to about 5 μm. At this time, the common electrode 805 is formed of a transparent conductive material.

The over-coat layer 804 is formed to have a thickness of about 1.2 μm to about 5 μm in the same manner as the over-coat layer 704 of FIG. 7, thereby preventing depression of the black matrix 802 partially overlapping with the seal pattern 806.

That is, when the support member 807 added to the seal pattern 806 is pressed by external pressure caused during or after attaching the liquid crystal display panel, the over-coat layer 804 with a thickness of about 1.2 μm to about 5 μm functions as a buffer layer thereby preventing compression of the black matrix 802 which partially overlaps with the seal pattern 806. As the depression of the black matrix 802 is prevented, a crack may be prevented from occurring at interfaces between the over-coat layer 804 and the black matrix 802, and between the black matrix 802 and the first transparent substrate 801.

Accordingly, outside air is prevented from flowing into the image display part thereby minimizing deficiency in the liquid crystal display panel, and preventing a break of the seal pattern 806.

As so far described, in a liquid crystal display panel according to the present invention, when a seal pattern is formed on a black matrix and an over-coat layer which are an organic film, the over-coat layer is formed to have a thickness of about 1.2 μm to about 5 μm thereby preventing the black matrix from being compressed as the support member added to the seal pattern is pressed by the outer pressure caused in or after attaching the liquid crystal display panel. So, a crack may be prevented from occurring at interfaces between the over-coat layer and the black matrix and between the black matrix and the substrate, and also, the seal pattern is prevented from being broken.

Accordingly, the outer air is prevented from flowing into the image display part, thereby minimizing deficiency in the liquid crystal display panel, improving a yield, and thus reducing the cost of the a product.

It will be apparent to those skilled in the art that various modifications and variations can be made in the liquid crystal display panel of the present invention without departing from the spirit or scope of the inventions. Thus, it is intended that the present invention covers the modifications and variations of this invention provided they come within the scope of the appended claims and their equivalents.

What is claimed is:

1. A liquid crystal display panel, comprising:
   a black matrix formed of an organic resin material, at a predetermined region of a first substrate and at a boundary region of pixels;
   a color filter on the black matrix corresponding to the pixels;
   an over-coat layer formed of an organic material on the first substrate having the black matrix and the color filter;
   a seal pattern on the over-coat layer, the seal pattern including a support member and is entirely overlapped with the black matrix, the support member including a glass ball or glass fiber;
   a second substrate having a thin film transistor, the second substrate being attached to the first substrate by the seal pattern; and
   a spacer between the first and second substrates to maintain uniformly a cell gap,
   wherein a thickness(t) of the over-coat layer is 3 μm<t<5 μm, said thickness on the first substrate absorbing an external force, to prevent the compression or depression of the black matrix and the glass ball or glass fiber having a diameter of about ±1 μm compared to the cell gap between the first and second substrates,
   wherein the black matrix is extended to an end portion of the first substrate so that the side surface of black matrix is exposed to the outside of the attached first and second substrates.

2. The liquid crystal display panel of claim 1, wherein the black matrix is formed one of acryl, epoxy and polyimide resin.

3. The liquid crystal display panel of claim 1, wherein the black matrix is formed of a resin including one of a carbon black material and a black pigment.

4. The liquid crystal display panel of claim 1, wherein the over-coat layer is one of epoxy, acryl or polyimide resin.

5. The liquid crystal display panel of claim 1, wherein the support member is added to seal pattern in a weight ratio of about 1% or less of a sealant of the seal pattern.

6. The liquid crystal display panel of claim 1, wherein about 500 or fewer support members are in at least one unit area of the seal pattern.

7. The liquid crystal display panel of claim 1, wherein about 150 or fewer support members are in at least one unit area of the seal pattern.

8. A liquid crystal display panel, comprising:
   a black matrix made of an organic resin material, and at a predetermined region of a first substrate and a boundary region of pixels;
   a color filter on the black matrix so as to correspond to the pixels;
   an over-coat layer formed of an organic material on the first substrate having the black matrix and the color filter;
   a common electrode on the over-coat layer;
   a seal pattern on the common electrode, the seal pattern including a support member and is entirely overlapped with the black matrix, the support member including a glass ball or glass fiber;
   a second substrate having a thin film transistor, the second substrate being attached to the first substrate by the seal pattern; and
   a spacer between the first and second substrates to maintain uniformly a cell gap,
   wherein thickness(t) of the over-coat layer 3 μm<t<5 μm, said thickness on the first substrate absorbing an external force to prevent the compression or depression of the black matrix and the glass ball or glass fiber having a diameter of about ±1 μm compared to the cell gap between the first and second substrates,
   wherein the black matrix is extended to an end portion of the first substrate so that the side surface of black matrix is exposed to the outside of the attached first and second substrates.

9. The liquid crystal display panel of claim 8, wherein the black matrix is formed one of acryl, epoxy and polyimide resin.

10. The liquid crystal display panel of claim 8, wherein the black matrix is formed of a resin including one of a carbon black material and a black pigment.

11. The liquid crystal display panel of claim 8, wherein the over-coat layer is formed of one of epoxy, acryl and polyimide resin.

12. The liquid crystal display panel of claim 8, wherein the common electrode is formed of one of ITO (indium tin oxide) or IZO (indium zinc oxide).

13. The liquid crystal display panel of claim 8, wherein the support member is added to seal pattern at a weight ratio of about 1% or less to sealant.

14. The liquid crystal display panel of claim 8, wherein about 500 or fewer support members are applied in at least one of unit areas of the seal pattern.

15. The liquid crystal display panel of claim 8, wherein about 150 or fewer support members are applied in at least one of unit areas of the seal pattern.

* * * * *